(12) United States Patent
Chheda (10) Patent No.: US 7,474,642 B1
(45) Date of Patent: Jan. 6, 2009

(54) SIGNALING RELIABILITY IN USING HIGH-SPEED SHARED PACKET DATA CHANNEL

(75) Inventor: Ashvin H. Chheda, Plano, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 781 days.

(21) Appl. No.: 10/941,468

(22) Filed: Sep. 15, 2004

(51) Int. Cl.
  *H04Q 7/00* (2006.01)
  *H04L 12/56* (2006.01)
  *H04B 7/216* (2006.01)

(52) U.S. Cl. .................. 370/329; 370/429; 370/418

(58) Field of Classification Search .......... 370/320, 370/335, 342, 441, 278, 235, 329, 418, 429; 455/512
See application file for complete search history.

(56) References Cited

U.S. PATENT DOCUMENTS

| | | | |
|---|---|---|---|
| 6,072,784 A * | 6/2000 | Agrawal et al. ............ 370/311 |
| 7,230,937 B2 * | 6/2007 | Chi et al. .................... 370/329 |
| 2003/0031119 A1 * | 2/2003 | Kim et al. ................... 370/200 |
| 2003/0045288 A1 * | 3/2003 | Luschi et al. ............... 455/434 |
| 2003/0108027 A1 * | 6/2003 | Kim et al. ................... 370/345 |
| 2003/0128705 A1 * | 7/2003 | Yi et al. ...................... 370/394 |
| 2003/0210669 A1 * | 11/2003 | Vayanos et al. ............ 370/335 |
| 2004/0013102 A1 * | 1/2004 | Fong et al. .................. 370/345 |
| 2004/0039833 A1 * | 2/2004 | Ludwig et al. ............. 709/230 |
| 2004/0160933 A1 * | 8/2004 | Odenwalder et al. ....... 370/342 |
| 2005/0022098 A1 * | 1/2005 | Vayanos et al. ............ 714/776 |
| 2005/0111391 A1 * | 5/2005 | Oki et al. .................... 370/311 |
| 2006/0050723 A1 * | 3/2006 | Yu .............................. 370/412 |
| 2006/0092972 A1 * | 5/2006 | Petrovic et al. ............ 370/469 |
| 2006/0092973 A1 * | 5/2006 | Petrovic et al. ............ 370/469 |
| 2006/0146749 A1 * | 7/2006 | Lundh et al. ............... 370/331 |
| 2008/0212588 A1 * | 9/2008 | Yi et al. ...................... 370/394 |

* cited by examiner

*Primary Examiner*—Chi H Pham
*Assistant Examiner*—Ahmed Elallam
(74) *Attorney, Agent, or Firm*—Garlick Harrison & Markison; James A. Harrison (57) ABSTRACT

The present invention provides a priority scheme and a data rate reduction method to increase the reliability of the signaling messages on a shared packet data channel. Signaling messages and packet data received for transmission are stored in a packet data buffer and at least one signaling buffer, respectively. Packet data or signaling messages are transmitted based on the scheduling algorithm assigned priority. The signaling message priorities are adjusted by a weighting factor assigned to the signaling buffer. The signaling message priority may be adjusted by a Quality of Service level. The transmission data rate is adjusted by an offset factor from the highest possible data rate that can be supported to a lower rate to improve reliability. To increase the effective data rate, the signaling message may be concatenated with another signaling message in order to completely fill the signaling message frame.

20 Claims, 8 Drawing Sheets

FIG. 1
communication network 10

FIG. 2  exemplary data and signaling message transmission on shared high speed packet data channel

FIG. 5 exemplary signaling message transmission rate adjustment based on offset and concatenation

FIG. 6 exemplary wireless network node with signaling message transmission logic

FIG. 9

SIGNALING RELIABILITY IN USING HIGH-SPEED SHARED PACKET DATA CHANNEL

BACKGROUND OF THE INVENTION

1. Technical Field of the Invention

The present invention relates to packet data networks and, more particularly, the present invention relates to scheduling on a high-speed shared packet data channel.

2. Description of Related Art

The structure and operation of cellular wireless communication systems is generally known. A cellular network infrastructure typically includes a plurality of base stations wherein each base station services wireless communications for one or more cellular mobile stations within a respective cell. Typically, each base station supports a plurality of sectors within its serviced cell. Base Station Controllers (BSCs) typically service a plurality of base stations and coordinate operations within the cells serviced by the base stations. A Mobile Switching Center (MSC) services a plurality of base station controllers and couples to the Public Switched Telephone Network (PSTN). Typically, the BSCs or the MSC couple to the Internet via the Packet Data Service Node (PDSN) to service packetized communications there through.

Cellular wireless infrastructures typically support one or more wireless protocol standards. These wireless protocol standards include Code Division Multiple Access (CDMA) protocol standards such as IS-95A, IS-95B, 1X-RTT, 1xEV-DO, 1xEV-EV, UMTS, and other CDMA-type protocols. Alternately, these wireless protocol standards may service a Time Division Multiple Access (TDMA) standard, such as the GSM standard, the North American TDMA standard, or other TDMA standards. The cellular mobile stations operating in the service area communicate with the base stations using such supported wireless protocol standards.

Cellular wireless communication service providers, as well as Internet service providers, are increasingly working together to support packetized services for subscribing mobile stations. Text messaging services, Internet browsing, some Voice over Internet Protocol (VoIP) services, and Video conferencing are examples of data/voice/video services now currently available to mobile stations. To provide these services, the cellular network infrastructure typically operates in cooperation with one or more servers coupled to the cellular wireless communication network via the Internet or an Intranet. These packet switched networks typically use the Internet Protocol (IP) and supporting protocols to service packetized communications between the mobile station and the server.

In supporting these services, CDMA protocols incorporate a shared high-speed forward packet data channel for the transmission of both packet data and signaling. The network operator typically employs a scheduling algorithm to prioritize transmission over the shared high-speed forward packet data channel. However, the signaling messages may contain delay sensitive information that cannot wait in the queue. The criticality of the signaling message may also require the error-free transmission of the signaling message. A need exists, therefore, for an apparatus and a method to guarantee the reliable transmission of signaling messages.

BRIEF SUMMARY OF THE INVENTION

The method and apparatus of the present invention provide a priority scheme and a data rate reduction method to increase the reliability of the signaling messages on a shared packet data channel and, more specifically, to improve a likelihood of delivering a timely error free signaling message. The method includes receiving signaling messages and packet data for transmission on the shared high-speed packet data channel and storing them in a signaling buffer and a packet data buffer, respectively. A scheduling algorithm assigns a data priority to each packet data in the packet data buffer and assigns a signaling priority to each signaling message in the signaling buffer. Thereafter, one of the packet data or the signaling message is transmitted based on the assigned data or signal priority, respectively. In one embodiment, the scheduling algorithm adjusts the signaling message priorities based on a weighting factor assigned to each entry in the signaling buffer. Alternatively, the signaling message priorities may be adjusted by an additional weighting factor based on a subscriber Quality of Service (QoS) level.

In another embodiment of the present invention, the signaling messages are stored in one of a plurality of signaling buffers. In one embodiment, the messages are stored in first and second signaling buffer based on the delay sensitivity of the signaling message. Critical signaling messages are stored in the first signaling buffer while non-critical signaling messages are stored in the second signaling buffer. Each signaling message is assigned a priority based on the weighting factor assigned to the first and second signaling buffers. The signaling messages from the first signaling buffer are transmitted first based on the assigned signaling message priority. The signaling messages from the second signaling buffer are transmitted after the first signaling buffer followed by the packet data from the packet data buffer. It is understood that more than two signaling buffers and corresponding assignment schemes may be implemented.

Based on a received channel condition signal, the method and apparatus of the present invention functions to adjust the transmission data rate of the signaling messages by an offset factor to improve reliability. A message data rate is the highest possible data rate that can be supported based on the received channel condition signal. However, the channel condition may change during the time spent in transmitting and decoding the channel condition signal. This may reduce the reliability of the message if sent at the highest possible data rate. The offset factor adjusts the message data rate to produce an adjusted data rate that is lower than the message data rate. This increases the reliability of the message. For efficiency purposes, the signaling message may be concatenated with one or more signaling messages in the queue in order to transmit at the adjusted data rate.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

DETAILED DESCRIPTION OF THE INVENTION

Figure 1:
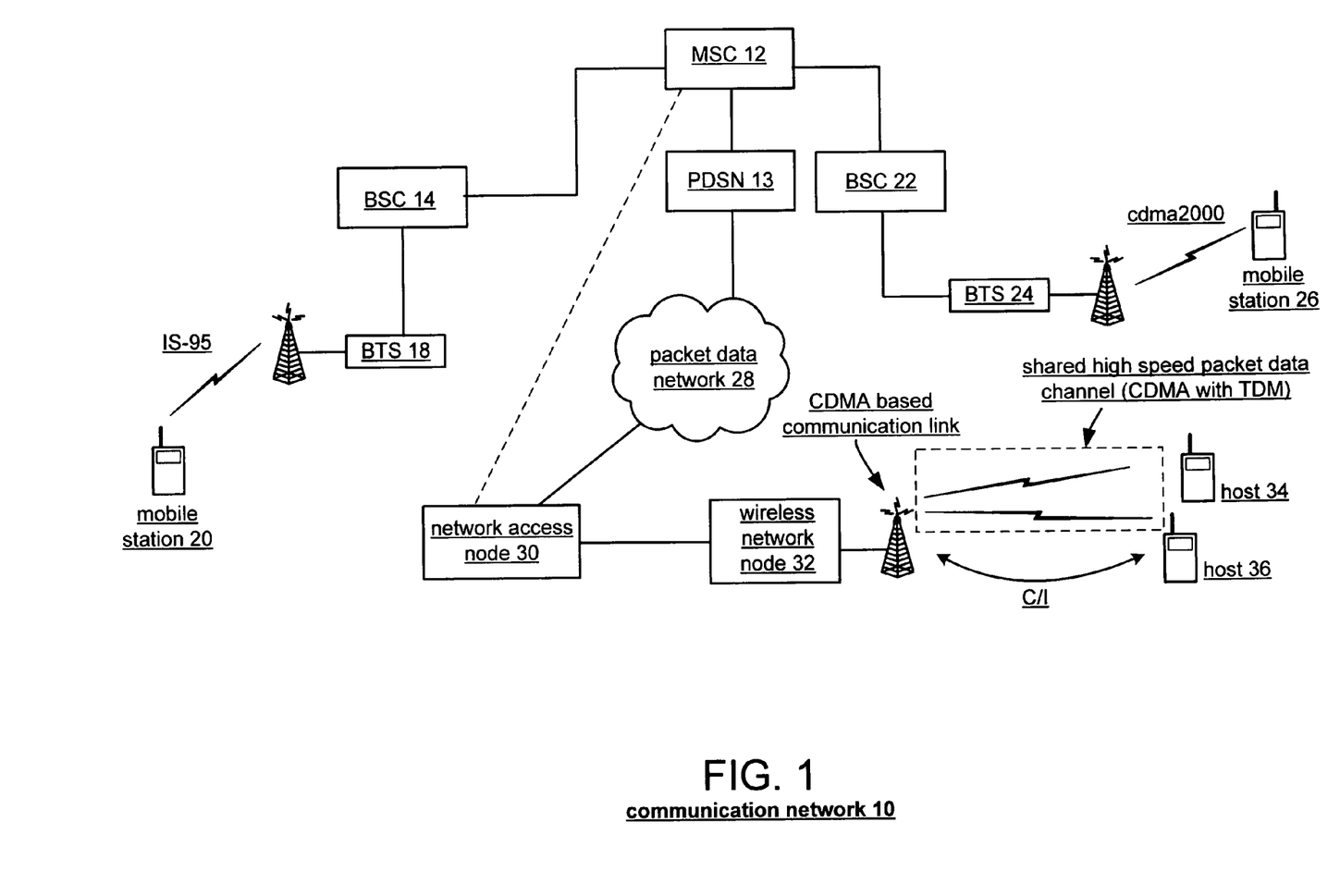
FIG. 1 is a functional block diagram of a communications network formed in accordance with the present invention.

FIG. 1 is a functional block diagram of a communications network formed in accordance with the present invention. As may be seen, communication network 10 includes mobile stations and mobile hosts that are operatively communicated over packet data network 28. For example, mobile station (MS) 20 is engaged in a voice call according to an IS-95 protocol over a wireless communication link with a Base Transceiver Station (BTS) 18. Similarly, a mobile station 26 is engaged in a packet data session over a wireless communication link with a BTS 24 according to cdma2000 protocols. The BTS 24 is generally coupled to communicate with a BSC 22. An MSC 12 controls calls (voice and data) routed through either BSC 14 or BSC 22 to operatively connect mobile station 20 or mobile station 26 to packet data network 28 via PDSN 13 or to the PSTN (not shown).

As can be seen in FIG. 1, hosts 34 and 36 communicate with a wireless network node 32 over a CDMA communications link to access packet data network 28 via network access node 30. Wireless network node 32 may comprise any type of access point or base station. Network access node 30 may comprise any type of network controller including, for example, base station controllers. As may further be seen in the exemplary network of FIG. 1, network access node 30 is coupled directly to packet data network 28. Alternatively, however, network access node 30 may couple directly to MSC 12 (as it would if it were a BSC).

The CDMA communications link includes a shared high-speed packet data channel. The shared high-speed packet data channel transmits packet data and signaling messages over the CDMA communications link using a spread spectrum Code Division Multiple Access (CDMA) spreading signal set and Time Division Multiplexing (TDM) procedure to transmit user signals. The advantage of using TDM over a CDMA protocol is that efficient scheduling of channel resources may be provided thereby to ensure that each mobile station and host has substantially fair access to the shared high-speed packet data channel and to increase the throughput efficiency of the system by enabling the use of multi-user diversity.

The transmission of both signaling messages and packet data over the shared high-speed packet data channel requires a scheduling method or algorithm to ensure that critical delay sensitive signaling messages are transmitted in a timely manner. The method and apparatus of the present invention assigns a signaling priority to each signaling message stored in one or more signaling buffers. A data priority is assigned to packet data stored in a packet data buffer. The signaling priorities may be scaled by a weighting factor based on the criticality of the signaling messages in one embodiment of the invention wherein a critical signaling message receives a higher priority than a non-critical message.

In order to increase signal transmission reliability, an embodiment of the present invention reduces the signal transmission data rate based on a received channel condition signal such as the Carrier to Interference (C/I) signal feedback. The C/I signal feedback indicates the current channel condition and is used to map channel conditions to a highest possible data rate for the channel conditions and a given reliability level. The highest possible data rate includes selecting the modulation type and coding rate based on the instantaneous channel conditions. The highest possible data rate is then adjusted by an offset factor to a lower adjusted data rate that further increases signal transmission reliability. An alternate embodiment produces an effective adjusted data rate that is higher than the adjusted data rate by concatenating two or more signaling messages; or to make use of the adjusted rate multiple signaling messages may need to be concatenated together. The concatenation places a plurality of signaling messages (for example, two signaling messages) within a signaling message frame when a single signaling message requires less than a full frame. This effectively increases the data transmitted per frame thereby effectively increasing the adjusted data rate. Incidentally, the concatenation may involve a complete signaling packet from the signaling buffer and a partial set of bits from the next packet waiting in the buffer; that is, whatever bits can be extracted to achieve the adjusted rate. In addition, the next time that particular signaling buffer is scheduled the rest of the packet can be concatenated with more bits from the next set of packets; again whatever bits can be used to achieve the adjusted rate at that time. In a further embodiment, for a signaling message having a high level of criticality, the signaling message is typically transmitted solely within the signaling message frame at the adjusted data rate. Thus, only signaling messages having lower levels of criticality are jointly transmitted within a single frame thereby increasing their effective message transmission rate from the adjusted rate. Other embodiments and features of the present invention will be described in the following figures.

Figure 2:
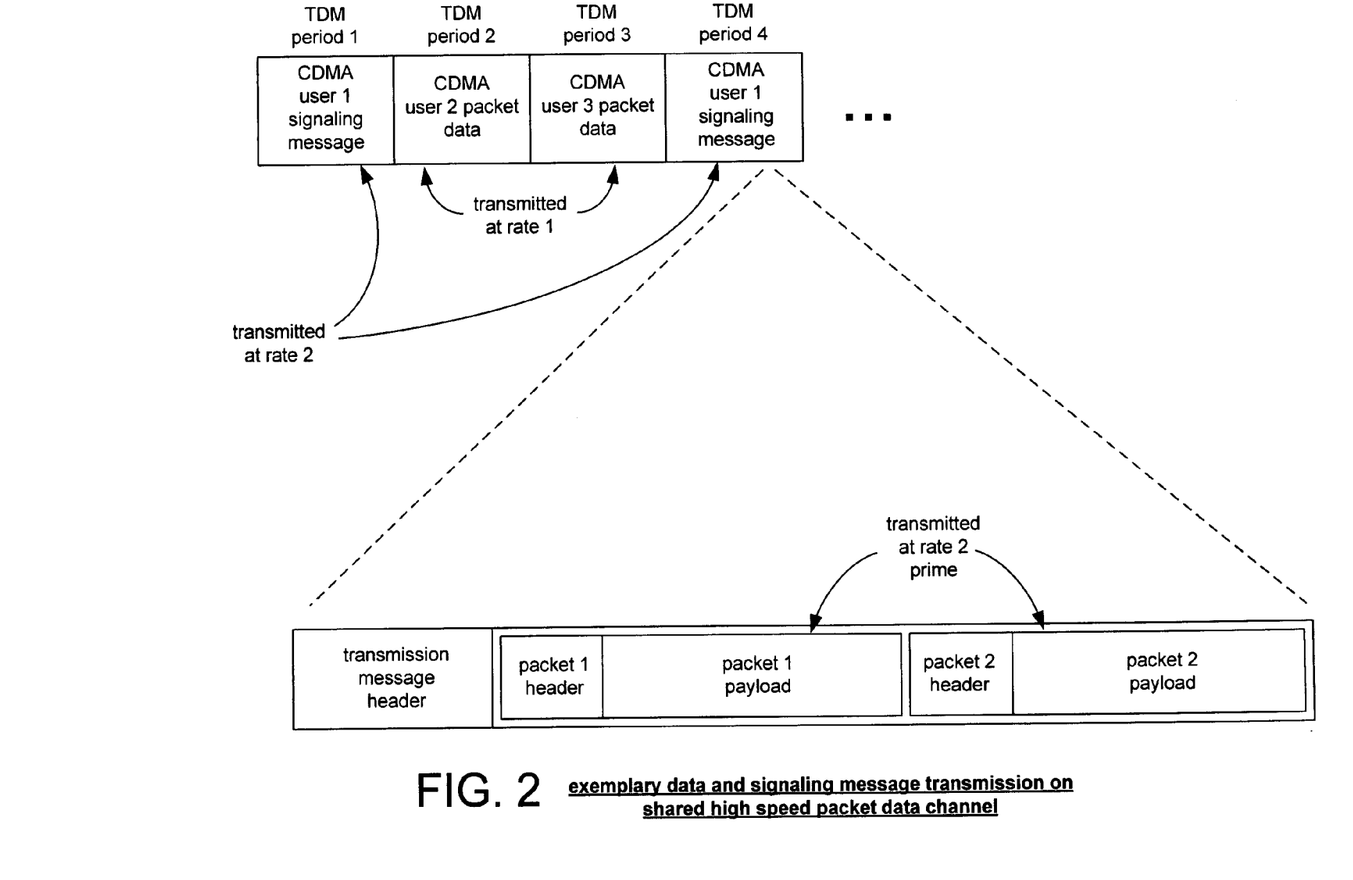
FIG. 2 is an exemplary data and signaling message transmission on a shared high-speed packet data channel.

FIG. 2 is an exemplary data and signaling message transmission on a shared high-speed packet data channel. An example of a shared high-speed packet data channel is a forward packet data channel (F-PDCH) in CDMA2000 Release C or D. The high-speed packet data channel employs TDM within the CDMA format. In TDM, each user is assigned one, two, or four time slots of 1.25 milliseconds each depending on the amount of data transmitted. The amount of data transmitted is determined by the transmission frame duration, the number of bits per transmission frame, and a selected coding algorithm. A scheduling algorithm adjusts the modulation according to instantaneous channel conditions as indicated by C/I feedback signal from a mobile terminal. The modulation may be any modulation type suitable for the instantaneous channel conditions, for example, 16QAM for channels experiencing low channel interference. In one embodiment, the selected modulation is one of Quadrature Phase Shift Keying (QPSK), 8 Quadrature Amplitude Modulation (QAM), or 16 QAM. The scheduling algorithm further assigns a priority to the packet data and signaling message for each user. The priority is further scaled by a weighting factor that may be further adjusted by a subscriber QoS weighting factor.

As can be seen in FIG. 2, three users, namely user 1, user 2, and user 3, are assigned TDM periods for the transition of signaling messages and packet data. Based on an assigned and scaled priority, the users are assigned the next available TDM period for transmission of signaling and packet data, respectively. For example, user 1 has a higher priority than that of either user 2 or user 3 and is assigned a first TDM period for transmission at signaling message rate 2. To improve signaling message reliability, signaling messages are transmitted at an adjusted data rate that is lower than a maximum message rate for the current channel conditions. Based on the C/I signal feedback, an offset factor reduces the maximum message rate to an adjusted rate. Thus, the user1 signaling messages in time periods 1 and 4 are transmitted at rate 2 that is lower than transmission rate 1.

User 2 is assigned a priority higher than user 3 and is therefore assigned the next TDM period. As can be seen, user 2 packet data is transmitted before user 3 packet data and user 1 signaling messages of a non-critical nature. User 2 may have a higher priority than user 3 based on the length of time the user has been waiting to transmit the data, which may be the result of poor channel conditions for user 2 or an excess of higher priority critical signaling messages. Non-critical signaling messages for user 1 is assigned to TDM period 4 following the transmission of packet data for user 3 in time period 3.

As can be further seen in FIG. 2, the user 1 signaling message in TDM period 4 comprises two signaling messages concatenated to fill the signaling message frame to better utilize the effective transmission rate. The first signaling message is included in the packet 1 payload, along with the packet 1 header, but does not completely fill up the signaling message frame; therefore the scheduling algorithm concatenates a second signaling message as a packet 2 payload in order to fill the signaling message frame. It should be noted that the second signaling message in the packet 2 payload may be only part of the second signaling message based on the assigned number of bits per transmission frame and the size of the first signaling message. By concatenating signaling messages, signaling messages that span multiple signaling packets are transmitted as efficiently as possible or at least more efficiently. Additionally, transmitting the maximum number of bits per frame in each TDM time slot increases the effective transmission rate from rate 2 to rate 2 prime.

Figure 3:
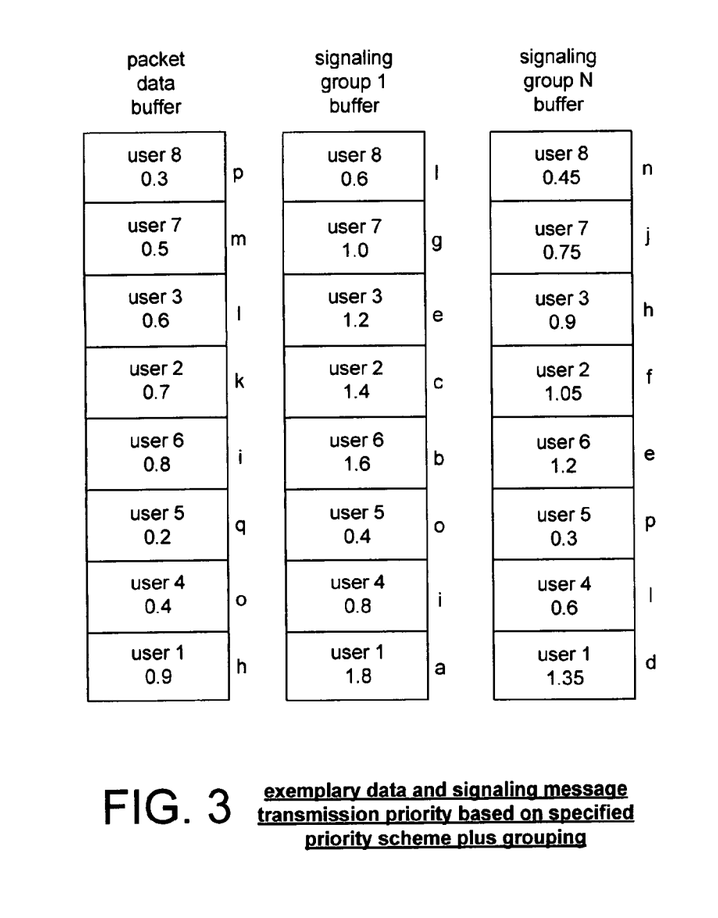
FIG. 3 is a functional block diagram of exemplary data and signaling message transmission priority based on a specified priority scheme plus grouping.

FIG. 3 is a functional block diagram of exemplary data and signaling message transmission priority based on a specified priority scheme plus grouping. Packet data are assigned to a packet data buffer, while signaling messages are assigned to one of a signaling group 1 buffer or a signaling group N buffer. The priority assigned to each user within each of the aforementioned buffers is based on a scheduling algorithm that uses a priority scheme, such as proportional fair (PF), round robin, or first-in-first-out (FIFO). In this embodiment of the present invention, the signaling messages in signaling group 1 buffer and signaling group N buffer are assigned weighting factors to adjust the scheduling algorithm's assigned priority.

As can be seen in FIG. 3, the user data in signaling group 1 buffer has been assigned an exemplary 2× (two times) weighting factor as compared to the data in the packet data buffer for each user, while the user data in signaling group N buffer has been assigned an exemplary weighting factor of 1.5× (one and one half times). In this example, signaling group 1 buffer contains signaling messages that are delay sensitive, i.e. critical, while the signaling messages in signaling group N buffer are delay tolerant, i.e. non-critical and therefore adjusted with a relatively lower value weighting factor. Additionally, the signaling messages in signaling group 1 buffer and signaling group N buffer may be further scaled by a subscriber QoS level assigned to each signaling message. The data in each of the buffers, namely the packet data buffer, the signaling group 1 buffer, and the signaling group N buffer, will be transmitted according to their scaled priority. For the purposes of discussion, each of the user data in each of the buffers has been assigned a letter code to illustrate the order of transmission of user data from the three buffers. For example, the user 1 data in signaling group 1 buffer, designated by letter "a", has the highest priority, 1.8, and is transmitted first. User 6 data in signaling group 1 buffer has a priority of 1.6, as designated by letter "b", and will be transmitted following the transmission of user 1 data. This sequence continues until all data from all three buffers has been transmitted. Note that because of the weighting factor and possibly a subscriber QoS level, the user data from signaling group 1 buffer is transmitted before most of the user data in the data packet buffer. The order of transmission, however, is actually based upon the assigned weight for a given user and signal type. In the instance where user 8 of signaling group 1 buffer has an identical priority to the user 3 data in the packet data buffer, the signaling messages have priority over the packet data messages. Signaling group N buffer data typically comprises non-critical signaling messages that are delay tolerant, thus, user data from the packet data buffer may be transmitted ahead of the non-critical signaling messages comprising signaling group N buffer. It should be noted that a plurality of different buffers may be implemented and that the invention is not limited to three buffers as shown in the example.

Figure 4:
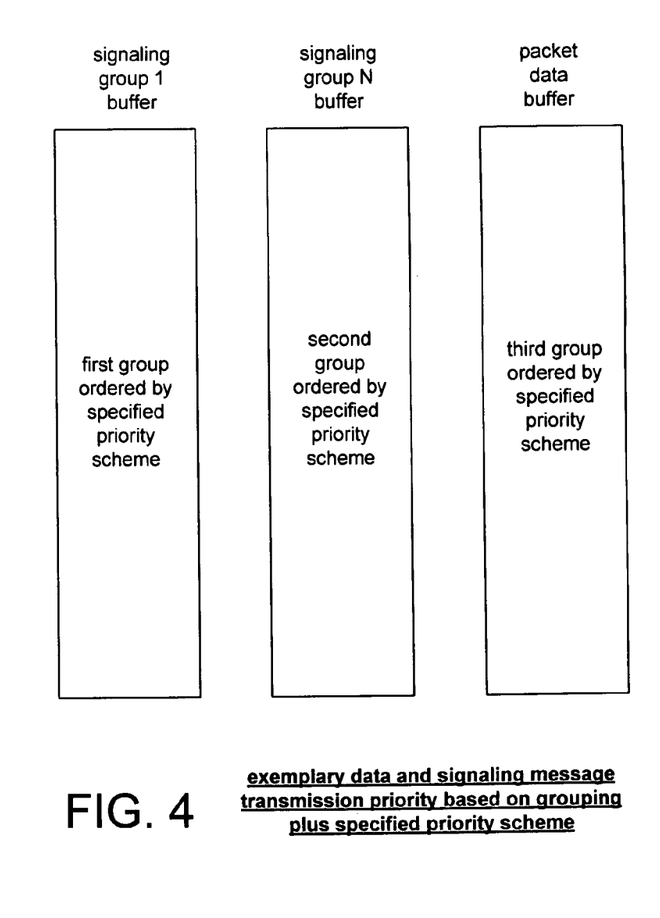
FIG. 4 is a functional block diagram of an exemplary data and signaling message transmission priority based on grouping plus a specified priority scheme.

FIG. 4 is a functional block diagram of an exemplary data and signaling message transmission priority based on grouping plus a specified priority scheme. In this embodiment of the present invention, user data in each of the buffers, namely signaling group 1 buffer, signaling group N buffer, and packet data buffer, are each assigned a priority based on a priority scheme assigned to each buffer. The user data of signaling group 1 buffer comprises critical delay sensitive signaling messages, and thus will be assigned the highest priority, while non-critical, non-delay sensitive signaling messages of signaling group N buffer will be assigned a priority by the specified group N priority scheme that is lower than the priority assigned to signaling group 1 buffer. The user data in the packet data buffer will be assigned a priority lower than that of either signaling group 1 buffer or signaling group N buffer. Based on this grouping priority scheme, all of the user data from signaling group 1 buffer will be transmitted first, followed by all of the signaling messages in the signaling group N buffer followed by the user data in the packet data buffer. User data from the packet data buffer will continue to be prioritized and transmitted until a signaling message is received by either signaling group 1 buffer or the signaling group N buffer, at which time the specified priority scheme will assign priorities and transmit the signaling messages. Within each buffer, any one of the prioritization schemes previously mentioned (e.g., proportional fair, round robin, etc.) may be used.

Figure 5:
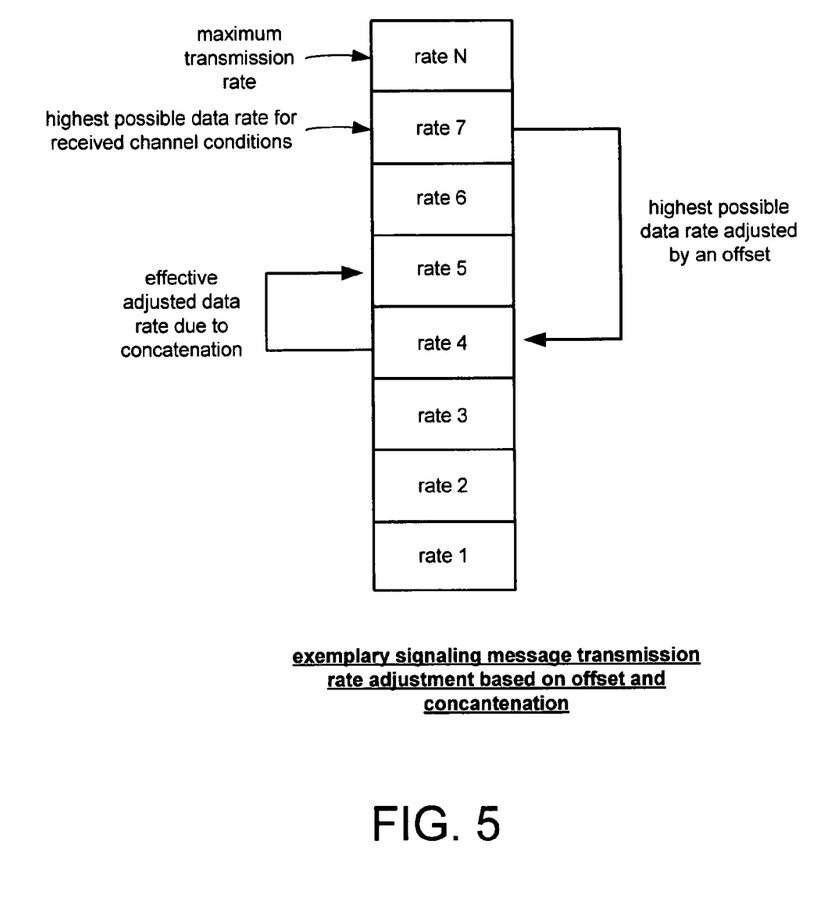
FIG. 5 is a functional block diagram of an exemplary signaling message transmission rate adjustment based on an offset factor and concatenation.

FIG. 5 is a functional block diagram of an exemplary signaling message transmission rate adjustment based on an offset factor and concatenation. In this embodiment of the present invention, the signaling message transmission rate is adjusted for improved reliability wherein the transmission rate is a combination of coding and modulation. The transmission rates of FIG. 5, namely rate N through rate 1, represent the maximum transmission rate for a selected modulation type (QPSK, 8QAM, etc.) through the lowest transmission rate, respectively. Each mobile user, namely host 36 or host 34 of FIG. 1, transmits a channel condition signal, C/I, on a reverse link each time period to indicate the instantaneous channel conditions. The received channel condition signal is mapped to a highest possible data rate for the received channel condition signal and modulation type. In the example of FIG. 5, transmission rate 7 is the highest possible data rate for the received channel conditions based on the C/I signal feedback received from the host.

Based on a reliability factor, which is essentially a signaling packet error rate, the highest possible data rate is adjusted by an offset factor to increase the reliability. As is known to one of average skill in the art, transmission rate is the combination of modulation and coding. The modulation and coding are adjusted to increase or decrease the throughput of a communications channel based on the quality of the radio channel. With a relatively good channel, modulation complexity can be increased and the code rate can be increased to increase the throughput of the communication channel at the expense of increased sensitivity to degradation and channel conditions. By adjusting the modulation and coding, known as Adaptive Modulation and Coding (AMC), the transmission rate is adjusted based on channel conditions so that retransmissions are minimized. Thus, in the example of FIG. 5, transmission rate 7 has been adjusted by an offset factor to transmission rate 4 in order to increase the reliability. The effective adjusted data rate may be increased indirectly as a result of the scheduler concatenating at least two signaling messages to completely fill a signaling message frame. As mentioned previously, if the signaling message does not completely fill the signaling frame, bits from a second signaling message packet are added to fill the signaling message frame. When a signaling message spans multiple signaling packets, concatenation increase the throughput of signaling message. This has the indirect effect of increasing the effective transmission rate since more bits are transmitted per frame.

Figure 6:
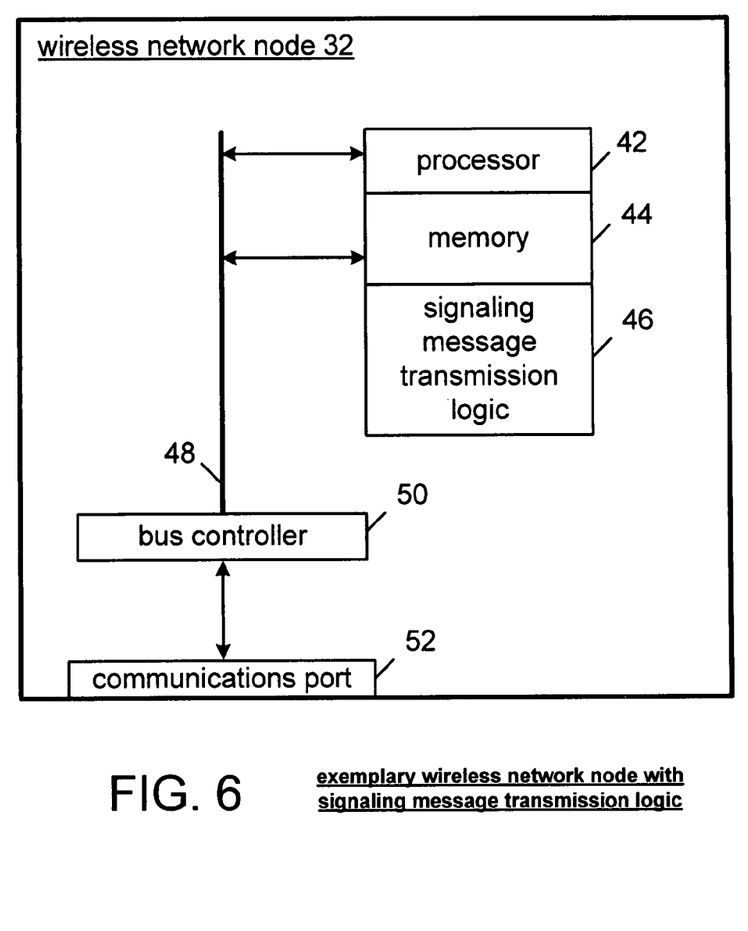
FIG. 6 is a functional block diagram of a wireless network node that illustrates one embodiment of the present invention.

FIG. 6 is a functional block diagram of a wireless network node 32 that illustrates one embodiment of the present invention. Wireless network node 32 includes a processor 42 that is coupled to communicate over a bus 48. A memory 44 further is coupled to bus 48 and is for storing computer instructions that define the operational logic of wireless network node 32. For example, the computer instructions define logic for prioritizing transmissions packet data and signaling messages. Bus 48 further is coupled to a bus controller 50, which controls the communications and timing of communications thereon. Bus controller 50 is further coupled to a communications port 52 that enables wireless network node 32 to communicate with network elements of a communications network.

In operation, processor 42 communicates with memory 44 by way of bus 48 to retrieve computer instructions stored therein and to execute the computer instructions to operate according to the logic defined within the computer instructions of memory 44. Memory 44 includes computer instructions that define signaling message transmission logic for controlling transmission of packet data and signaling messages on a shared high-speed packet data channel. Memory 44 also includes computer instructions that define logic for assigning a data priority to each packet data in the packet data buffer based on a scheduling algorithm and that define logic for assigning a signal priority to each signaling message in the signaling buffer based on a scheduling algorithm. Memory 44 further includes instructions defining logic for selecting one of the packet data or the signaling message as a next transmitted packet based on the assigned data or signal priority.

Figure 7:
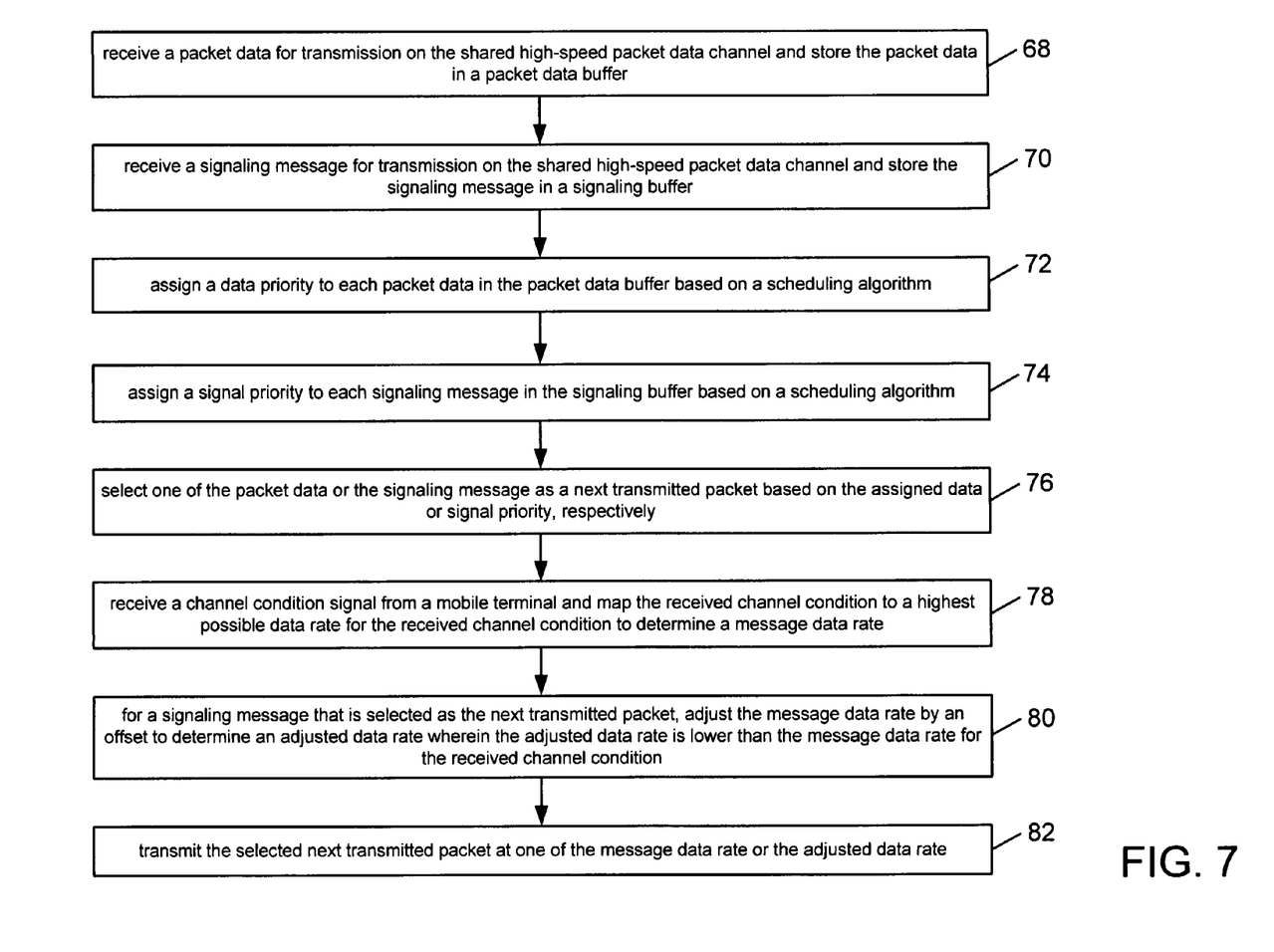
FIG. 7 is a flow chart illustrating a method for controlling transmission of packet data and signaling messages on a shared high-speed packet data channel to improve reliability of the signaling message.

FIG. 7 is a flow chart illustrating a method for controlling transmission of packet data and signaling messages on a shared high-speed packet data channel to improve reliability of the signaling message. The method includes a wireless network node receiving a packet data for transmission on the shared high-speed packet data channel and storing the packet data in a packet data buffer (step 68) and receiving a signaling message for transmission on the shared high-speed packet data channel and storing the signaling message in a signaling buffer (step 70).

Thereafter, the wireless network node assigns a data priority to each packet data in the packet data buffer based on a scheduling algorithm (step 72). The scheduling algorithm may be one of proportional fair, first-in-first-out (FIFO), or round robin. The purpose of the scheduling algorithm is to insure each user adequate access to the transmission resources. Similarly, the wireless network node assigns a signal priority to each signaling message in the signaling buffer based on a scheduling algorithm (step 74). Additionally, the priority of the signaling messages may be scaled by a weighting factor to increase the signal priority relative to the data priority. By scaling the signal priority, critical (delay sensitive) signaling messages are transmitted before delay tolerant packet data. The signaling messages may be further scaled by a subscriber QoS level that ensures the subscribed user high access to the network resources.

After prioritization, the wireless network node selects one of the packet data or the signaling message as a next transmitted packet based on the assigned data or signal priority, respectively (step 76). Each mobile terminal transmits a C/I channel condition signal or any other relevant signal that reflects the current forward link channel condition on a reverse channel communications link. The C/I signal feedback indicates the current condition of the channel and is used by the wireless network node to adjust the modulation and coding for the highest possible data rate for the reported C/I. Thus, the wireless network node receives the channel condition signal from the mobile terminal and maps the received channel condition to a highest possible data rate for the received channel condition to determine a message data rate (step 78). Thereafter, the wireless network node, for a signaling message that is selected as the next transmitted packet, adjusts the message data rate by an offset factor to determine an adjusted data rate wherein the adjusted data rate is lower than the message data rate for the received channel condition (step 80). The adjusted data rate minimizes the probability the signaling message will be received in error and require retransmission. Thereafter, the wireless network node transmits the selected next transmitted packet at one of the message data rate or the adjusted data rate (step 82).

Figure 8:
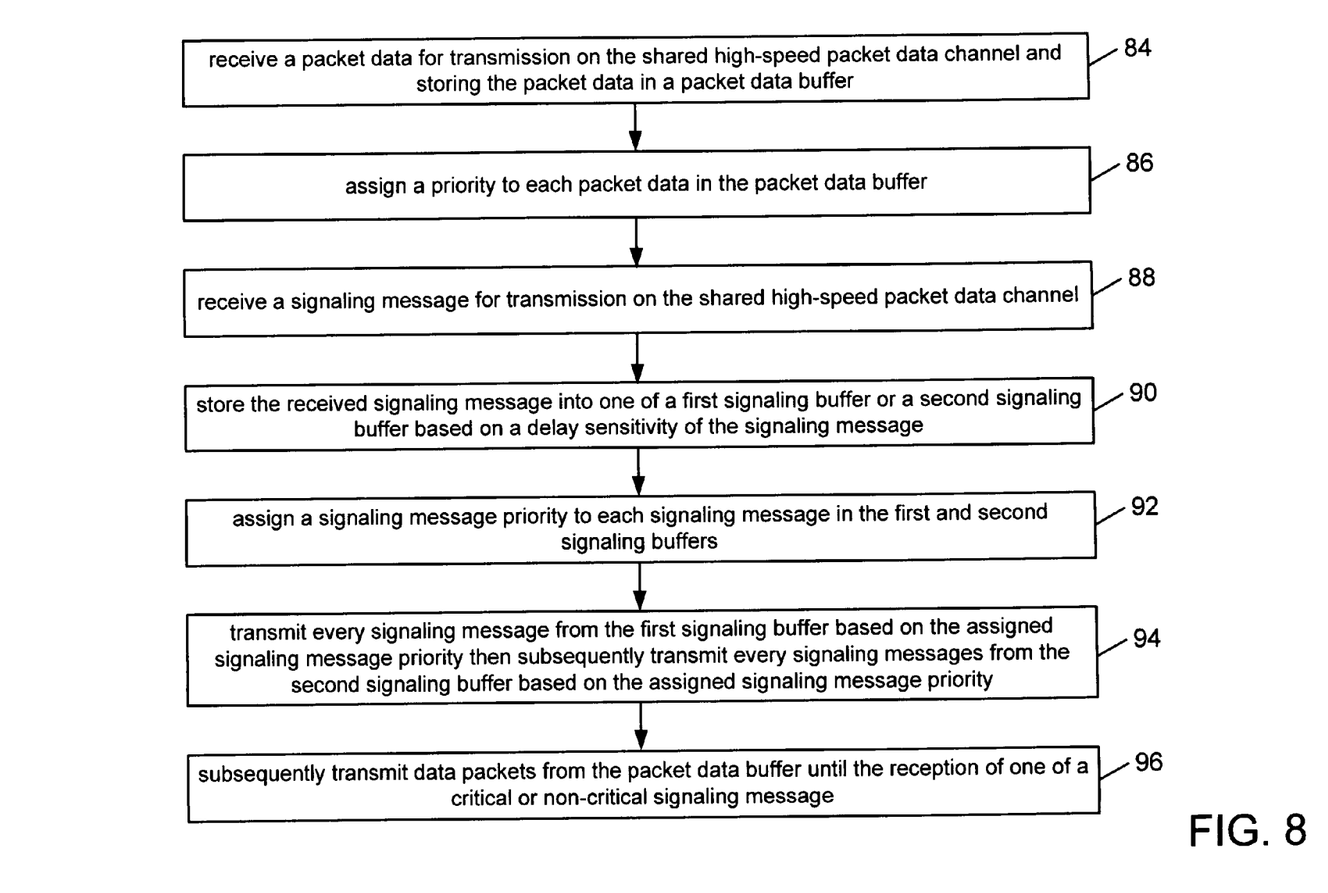
FIG. 8 is a flow chart illustrating a method for controlling transmission of packet data and signaling messages on a shared high-speed packet data channel to improve reliability of the signaling message.

FIG. 8 is a flow chart illustrating a method for controlling transmission of packet data and signaling messages on a shared high-speed packet data channel to improve reliability of the signaling message. The method includes a wireless network node receiving a packet data for transmission on the shared high-speed packet data channel and storing the packet data in a packet data buffer (step 84). The wireless network node uses a scheduling algorithm to assign a data priority to each packet data in the packet data buffer (step 86). The wireless network node receives a signaling message for transmission on the shared high-speed packet data channel (step 88) and stores the received signaling message into one of a first signaling buffer or a second signaling buffer based on a delay sensitivity of the signaling message (step 90). Signaling messages that are delay sensitive, i.e. critical, such as signals that affect the connectivity of the mobile terminal, are stored in the first signaling buffer whereas a delay tolerant signaling message, i.e. non-critical, is stored in the second signaling buffer.

The wireless network node uses a scheduling algorithm to assign a signaling message priority to each signaling message in the first and second signaling buffers (step 92). The scheduling algorithm may be one of proportional fair, first-in-first-out (FIFO), or round robin. The purpose of the scheduling algorithm is to insure each user adequate access to the transmission resources. The scheduling algorithm then adjusts the signaling message priorities in the first signaling buffer by a first weighting factor and adjusts the signaling message priorities in the second signaling buffer by a second weighting factor. The weighting factor for the first signaling buffer is larger than the weighting factor for the second signaling buffer. The difference in weighting factors ensures critical signaling messages are transmitted before non-critical signaling messages. Additionally, the scheduling algorithm may adjust the signaling message priority based on a subscriber QoS level.

Thereafter, the wireless network node transmits every signaling message from the first signaling buffer based on the assigned signaling message priority and subsequently transmits every signaling message from the second signaling buffer based on the assigned signaling message priority (step 94), and then subsequently transmitting the data packets from the packet data buffer until the reception of one of a critical or non-critical signaling message (step 96).

Figure 9:
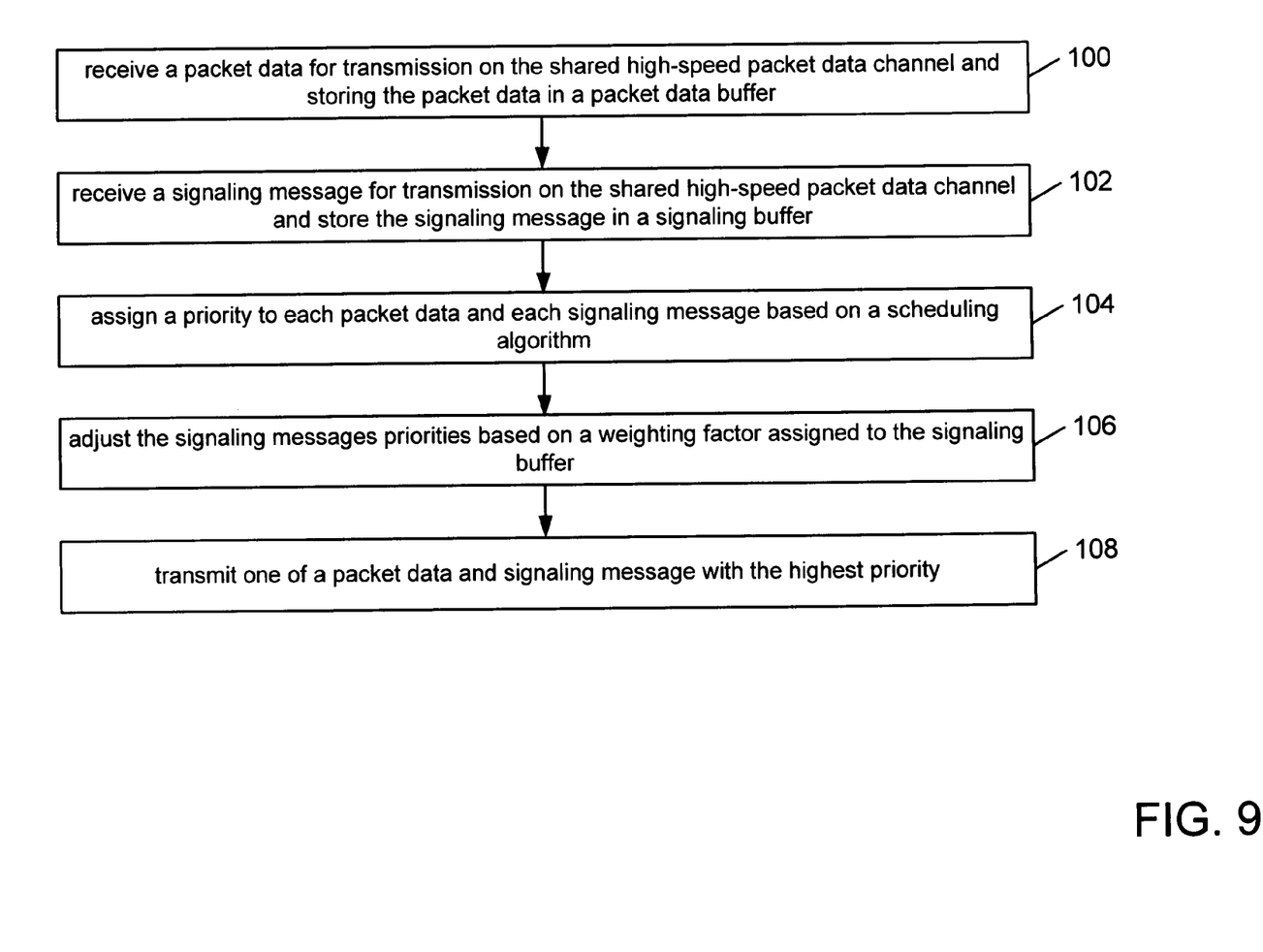
FIG. 9 is a flow chart illustrating a method for controlling transmission of packet data and signaling messages on a shared high-speed packet data channel to improve reliability of the signaling message.

FIG. 9 is a flow chart illustrating a method for controlling transmission of packet data and signaling messages on a shared high-speed packet data channel to improve reliability of the signaling message. The wireless network node receives a packet data for transmission on the shared high-speed packet data channel and stores the packet data in a packet data buffer (step 100). It also receives a signaling message for transmission on the shared high-speed packet data channel and stores the signaling message in a signaling buffer (step 102). The wireless network node assigns a data priority to each packet data and assigns a signaling priority to each signaling message based on a scheduling algorithm (step 104). As previously mentioned, the algorithm may include one of proportional fair, round robin, or first-in-first-out. The delay sensitive signaling message should be sent prior to packet data so the scheduling algorithm adjusts the signaling messages priorities based on a weighting factor assigned to the signaling buffer (step 106). Thereafter, the wireless network node transmits one of the packet data and signaling message with the highest priority (step 108).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims.

What is claimed is:

1. A method for controlling transmission of packet data and signaling messages on a shared high-speed packet data channel to improve reliability of the signaling messages, the method comprising:
   receiving a packet data for transmission on the shared high-speed packet data channel and storing the packet data in a packet data buffer;
   receiving a signaling message for transmission on the shared high-speed packet data channel and storing the signaling message in a signaling buffer;
   assigning a data priority to each packet data in the packet data buffer based on a scheduling algorithm;
   assigning a signaling message priority to each signaling message in the signaling buffer based on a scheduling algorithm;
   selecting one of the packet data or the signaling message as a next transmitted packet based on the assigned data or signal priority, respectively;
   receiving a channel condition signal from a mobile terminal;
   mapping the received channel condition signal to a highest possible data rate for the received channel condition signal to determine a message data rate;
   for a signaling message that is selected as the next transmitted packet, adjusting the message data rate by an offset factor to determine an adjusted data rate wherein the adjusted data rate is lower than the message data rate for the received channel condition signal; and
   transmitting the selected next transmitted packet at one of the message data rate or the adjusted data rate.

2. The method of claim 1 wherein the transmitting the signaling message further comprises concatenating at least two signaling messages within a signaling message frame to increase an effective signaling message transmission rate from the adjusted data rate for a specified group of signaling messages wherein the specified group of signaling messages comprises non-critical signaling messages.

3. The method of claim 1 wherein the assigning the signaling message priority further comprises adjusting the signaling message priority based on a subscriber Quality of Service (QoS) level assigned to each signaling message.

4. The method of claim 1 wherein the assigning the data priority and the signaling message priority comprises scaling the signaling messages by a weighting factor to increase the signaling message priority relative to the data priority.

5. A method for controlling transmission of packet data and signaling messages on a shared high-speed packet data channel to improve reliability of the signaling messages, the method comprising:
   receiving a packet data for transmission on the shared high-speed packet data channel and storing the packet data in a packet data buffer;

assigning a packet data priority to each packet data in the packet data buffer;

receiving a signaling message for transmission on the shared high-speed packet data channel;

storing the received signaling message into one of a first signaling buffer or a second signaling buffer based on a delay sensitivity of the signaling message;

assigning a signaling message priority to each signaling message in the first and second signaling buffers;

transmitting each of the signaling messages from the first signaling buffer based on the assigned signaling message priority;

subsequently transmitting each of the signaling messages from the second signaling buffer based on the assigned signaling message priority; and subsequently transmitting packet data from the packet data buffer until the reception of one of a critical or non-critical signaling message having an assigned priority that is the same as or higher than the packet data.

6. The method of claim 5 wherein the assigning the packet data priority and signaling message priority comprises assigning the priorities based on a scheduling algorithm.

7. The method of claim 6 wherein the scheduling algorithm comprises one of proportional-fair, round robin, and first-in-first-out.

8. The method of claim 7 wherein the assigning the signaling message priority further comprises adjusting the signaling message priority in the first signaling buffer by a first weighting factor and adjusting the signaling message priority in the second signaling buffer by a second weighting factor.

9. The method of claim 8 wherein the adjusting the signaling message priority further comprises adjusting the signaling message priority based on a subscriber Quality of Service (QoS) level assigned to each signaling message.

10. The method of claim 5 wherein the transmitting the signaling message further comprises concatenating at least two non-critical signaling messages in a signaling message frame.

11. The method of claim 10 wherein the at least two signaling messages are non-critical signaling messages.

12. The method of claim 5 wherein transmitting signaling messages from one of the first and second signaling buffers comprises:

receiving a channel condition signal from a mobile terminal;

mapping the received channel condition signal to a highest possible data rate for the received channel condition signal to determine a message data rate; and adjusting the message data rate by an offset factor to determine an adjusted data rate wherein the adjusted data rate is lower than the message data rate for the received channel condition signal.

13. The method of claim 12 wherein the adjusting the message data rate further comprises adjusting the message data rate by a first amount for a first group of signaling messages and by a second amount for a second group of signaling messages.

14. A method for controlling transmission of packet data and signaling messages on a shared high-speed packet data channel to improve reliability of the signaling messages, the method comprising:

receiving at least one packet data for transmission on the shared high-speed packet data channel and storing the packet data in a packet data buffer;

receiving at least one signaling message for transmission on the shared high-speed packet data channel and storing the at least one signaling message in a signaling buffer;

assigning a data priority to each packet data and assigning a signaling message priority to each signaling message based on a scheduling algorithm;

adjusting the signaling message priority based on a weighting factor assigned to the signaling buffer;

transmitting one of a packet data and signaling message with the highest priority.

15. The method of claim 14 wherein the assigning the data priority further comprises adjusting the data priority based on one of a weighting factor assigned to the packet data buffer and a subscriber Quality of Service (QoS) weighting factor assigned to each data packet.

16. The method of claim 14 wherein the adjusting the signaling message priority further comprises adjusting the data priority based on a subscriber Quality of Service (QoS) weighting factor assigned to each signaling message.

17. The method of claim 14 wherein the transmitting the signaling message further comprises concatenating at least two signaling messages within a signaling message frame to increase an effective signaling message transmission rate from the adjusted data rate for a specified group of signaling messages wherein the specified group of signaling messages comprises non-critical signaling messages.

18. The method of claim 17 wherein the specified group of signaling messages comprises non-critical signaling messages.

19. The method of claim 14 wherein transmitting the signaling messages comprises:

receiving a channel condition signal from a mobile terminal;

mapping the received channel condition signal to a highest possible data rate for the received channel condition signal to determine a message data rate; and adjusting the message data rate by an offset factor to determine an adjusted data rate wherein the adjusted data rate is lower than the message data rate for the received channel condition signal.

20. The method of claim 19 wherein the adjusting the message data rate further comprises adjusting the message data rate by a first amount for a first group of signaling messages and by a second amount for a second group of signaling messages.

* * * * *